(12) United States Patent
Okazaki et al.

(10) Patent No.: US 6,736,200 B2
(45) Date of Patent: May 18, 2004

(54) HEAT-EXCHANGING METHOD FOR EASILY POLYMERIZABLE COMPOUND

(75) Inventors: Kazuto Okazaki, Himeji (JP); Yukihiro Matsumoto, Kobe (JP); Sei Nakahara, Himeji (JP); Hiroo Iwato, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 300 days.

(21) Appl. No.: 09/746,916

(22) Filed: Dec. 23, 2000

(65) Prior Publication Data

US 2001/0006104 A1 Jul. 5, 2001

(30) Foreign Application Priority Data

Dec. 28, 1999 (JP) ............................................. 11-374094

(51) Int. Cl.[7] ................................................. F28D 7/02
(52) U.S. Cl. ....................... 165/164; 165/166; 528/503; 526/65
(58) Field of Search ................................. 165/181, 164, 165/158, 163, 166; 528/503, 501, 502 C, 502 R; 526/64, 65

(56) References Cited

U.S. PATENT DOCUMENTS

| 4,200,734 A | * | 4/1980 | Muehlenbrock et al. .... 528/503 |
| 5,122,580 A | * | 6/1992 | Zarian et al. .................. 526/64 |
| 5,804,676 A | * | 9/1998 | Hieda et al. .................. 528/501 |

* cited by examiner

*Primary Examiner*—Christopher Atkinson
(74) *Attorney, Agent, or Firm*—Haugen Law Firm PLLP

(57) ABSTRACT

The present invention provides a heat-exchanging method for an easily polymerizable compound which method effectively prevents polymerization in a heat exchanger to enable a long-term stable heat exchange when an easily polymerizable liquid compound (for example, acrylate ester) or an easily polymerizable compound-containing liquid (for example, aqueous acrylic acid solution) is heat-exchanged. A vertical spiral type heat exchanger with a fluid path space of not less than 6 mm is used as a heat exchanger to carry out the heat exchange under conditions where the average liquid flow rate is not less than 0.2 m/sec and where the liquid residence time is not more than 100 seconds.

9 Claims, 3 Drawing Sheets

HEAT-EXCHANGING METHOD FOR EASILY POLYMERIZABLE COMPOUND

BACKGROUND OF THE INVENTION

A. Technical Field

The present invention relates to a heat-exchanging method for an easily polymerizable compound. Specifically, the invention relates to a heat-exchanging method for easily polymerizable liquid compounds, such as (meth)acrylate esters, or easily polymerizable compound-containing liquids which method effectively prevents polymerization of the easily polymerizable compounds in heat exchangers.

B. Background Art

As to heat exchangers for heating and cooling of liquids, generally, shell-and-tube-type heat exchangers are used. However, in the case where the heat of liquids containing easily polymerizable compounds such as (meth)acrylic acid is exchanged using these shell-and-tube-type heat exchangers, polymerization of the easily polymerizable compounds occurs in the heat exchangers to lead not only to the deterioration of the heat exchangeability, but also to inside clogging of the heat exchangers, with the result that long-term stable operation becomes impossible.

The above polymerization in the shell-and-tube-type heat exchangers is considered to occur by the following mechanism. When heat is exchanged by running the easily polymerizable compound-containing liquid (which might hereinafter be referred to simply as "liquid") to the shell side, a polymer forms at the liquid stagnant area which appears near a baffle plate, and then this polymer adheres to the outer surface of peripheral tubes. As a result, the heat conduction resistance increases to deteriorate the heat exchangeability. In addition, when the easily polymerizable compound-containing liquid is run to the tube side, a polymer similarly forms at the liquid stagnant area which appears in the channel, and then this polymer adheres to the inner surface of the tubes, resulting in the deterioration of the heat exchangeability. Furthermore, since the path is not single either at the shell or tube side, the liquid flow stagnates in polymer-adhered areas and, as a result, a chain growth of the adhered polymer occurs to lead to further deterioration of the heat exchangeability and finally to inside clogging of the heat exchanger.

Thus, in the case where the shell-and-tube-type heat exchanger is used, it is difficult to heat-exchange the easily polymerizable compound-containing liquid stably for a long period of time.

SUMMARY OF THE INVENTION

A. Object of the Invention

To solve the above prior art problems, the present invention has an object to provide a heat-exchanging method for an easily polymerizable compound which method effectively prevents polymerization of an easily polymerizable liquid compound or an easily polymerizable compound-containing liquid to enable a long-term stable heat exchange when the easily polymerizable liquid compound or the easily polymerizable compound-containing liquid is heat-exchanged.

B. Disclosure of the Invention

As is aforementioned, the deterioration of the heat exchangeability of the heat exchanger and the inside clogging of the heat exchanger, which are caused by the polymerization of the easily polymerizable compound in the heat exchanger, are triggered by: 1) the formation of polymer at the liquid stagnant area, 2) the attachment of this polymer to the heat transfer surface, and 3) the chain growth of the attached polymer.

The following have been found from the present inventors' studies.

(1) For the prevention of the above factors 1) to 3) of the inside clogging of the heat exchanger, it is desired to singularize the liquid path and to decrease the liquid stagnant area in the heat exchanger as much as possible.

(2) Examples of single path heat exchangers include double-tube type heat exchangers and spiral type heat exchangers, but the former involve an extreme increase of installation space, therefore the latter spiral type heat exchangers are preferred for industrial use.

(3) Generally, the spiral type heat exchangers are classified into a vertical type and a horizontal type and, as to either type, two fluids for the heat exchange run through the single and rotary path, and the heat is exchanged by countercurrent flow. Incidentally, in the case where a fluid of small density such as steam or gas is used as a heating or cooling medium, an orthogonal current flow type vertical spiral heat exchanger to run the medium in an axial direction might be employed.

(4) As to a feature of the spiral type heat exchanger, the auto-cleaning function by energy of collision of a fluid with deposits to a spiral plate is known. Therefore, this heat exchanger is often used for heat exchange of a slurry-containing liquid which tends to cause troubles such as inside clogging of the heat exchanger. In addition, the horizontal type is assumed to generally have more auto-cleaning function.

(5) As to the heat exchange of the easily polymerizable compound-containing liquid, however, the tackiness of the formed and adhered polymer is so strong that the auto-cleaning function cannot sufficiently be exhibited upon the polymer that has adhered to the spiral plate.

(6) Therefore, for the prevention of the clogging during the heat exchange of the easily polymerizable compound, it is required to suppress the polymer formation in the heat exchanger and further to prevent the formed polymer from adhering to the spiral plate.

(7) In the prevention of the clogging with the slurry-containing liquid, the horizontal type has so far been assumed to be more effective. However, upon the easily polymerizable compound-containing liquid, rather the vertical type has been found to be more effective.

(8) In addition, for effective prevention of the polymerization in the heat exchanger to enable long-term stable operation, it is necessary that a vertical spiral type heat exchanger with a fluid path space of not less than 6 mm is used to carry out the heat exchange under conditions where the average liquid flow rate per unit sectional area of the path is not less than 0.2 m/sec, preferably in the range of 0.4 to 1 m/sec, and where the liquid residence time in the heat exchanger is not more than 100 seconds, preferably in the range of 60 to 15 seconds.

The present invention has been completed on the basis of the above findings.

That is, the present invention provides a heat-exchanging method for an easily polymerizable compound, in which a vertical spiral type heat exchanger with a fluid path space of not less than 6 mm is used as a heat exchanger to heat-exchange the easily polymerizable compound under conditions where the average liquid flow rate is not less than 0.2 m/sec and where the liquid residence time is not more than 100 seconds.

Incidentally, the average liquid flow rate and the liquid residence time are defined as follows.

Average flow rate (m/sec)={flow rate at inlet of spiral type heat exchanger (m³/sec)}/{path space (m)×path width (m)}

Residence time (sec)={heat transfer area (m²)×path space (m)}/ {flow rate at inlet of spiral type heat exchanger (m³/sec)}

These and other objects and the advantages of the present invention will be more fully apparent from the following detailed disclosure.

BRIEF DESCRIPTION OF THE DRAWINGS

In FIGS. 1 to 3, "1" symbolizes a path of a heat exchange medium, and "2" symbolizes a path of an easily polymerizable liquid compound (or easily polymerizable compound-containing liquid), and "3" symbolizes a path space, and "4" symbolizes a path width.

DETAILED DESCRIPTION OF THE INVENTION

Figure 1:
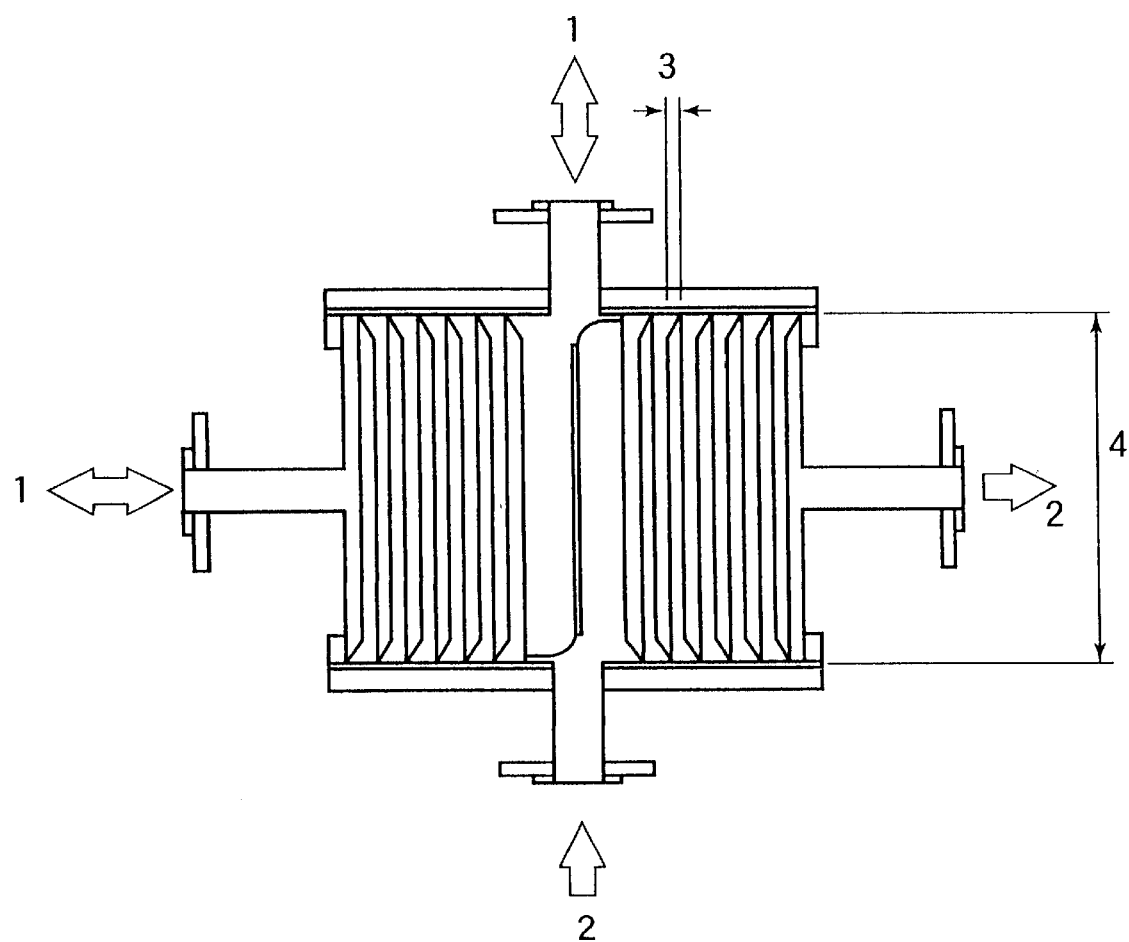
FIG. 1 is a longitudinal sectional conceptual view of a vertical countercurrent flow type spiral heat exchanger.
Figure 2:
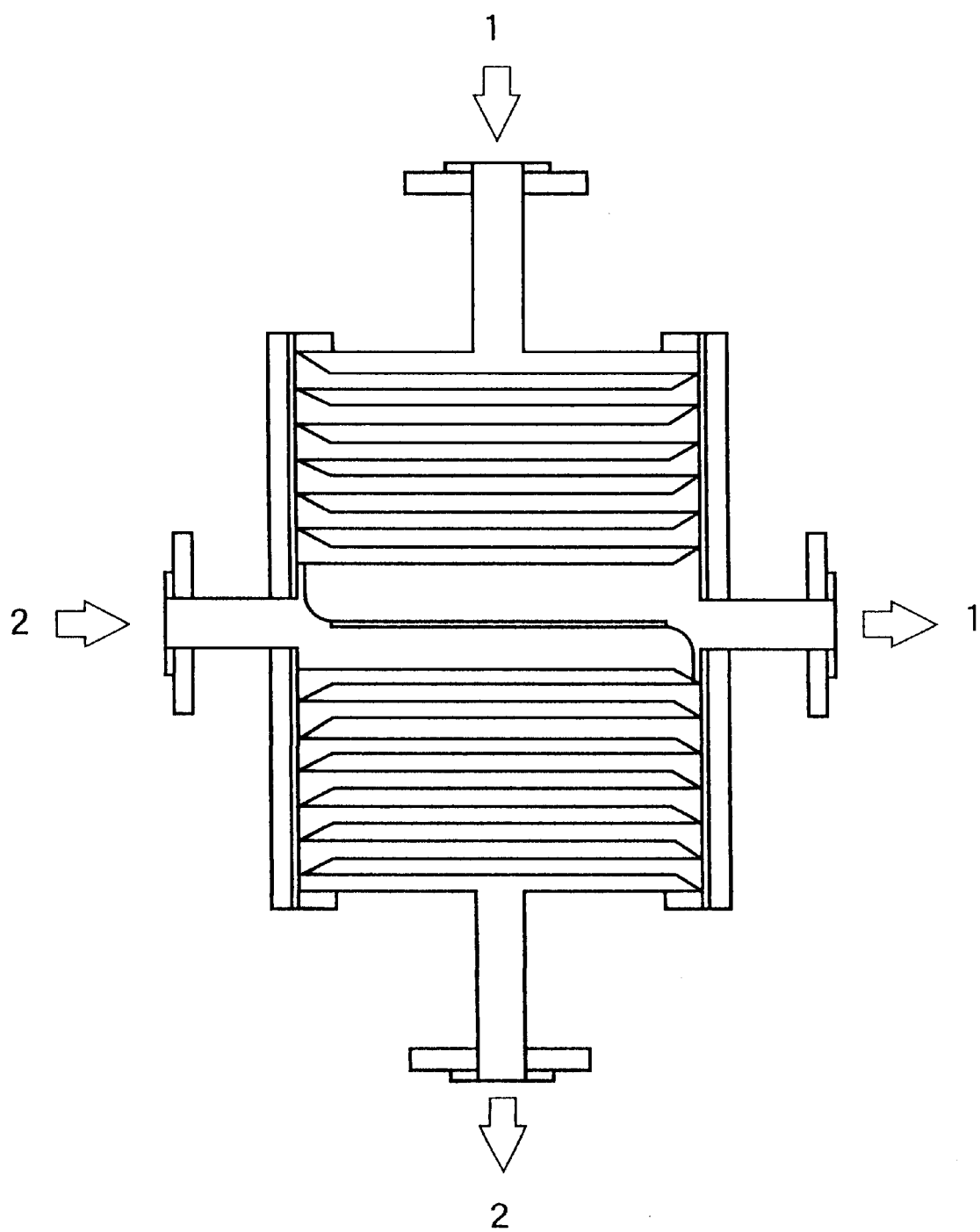
FIG. 2 is a longitudinal sectional conceptual view of a horizontal countercurrent flow type spiral heat exchanger.
Figure 3:
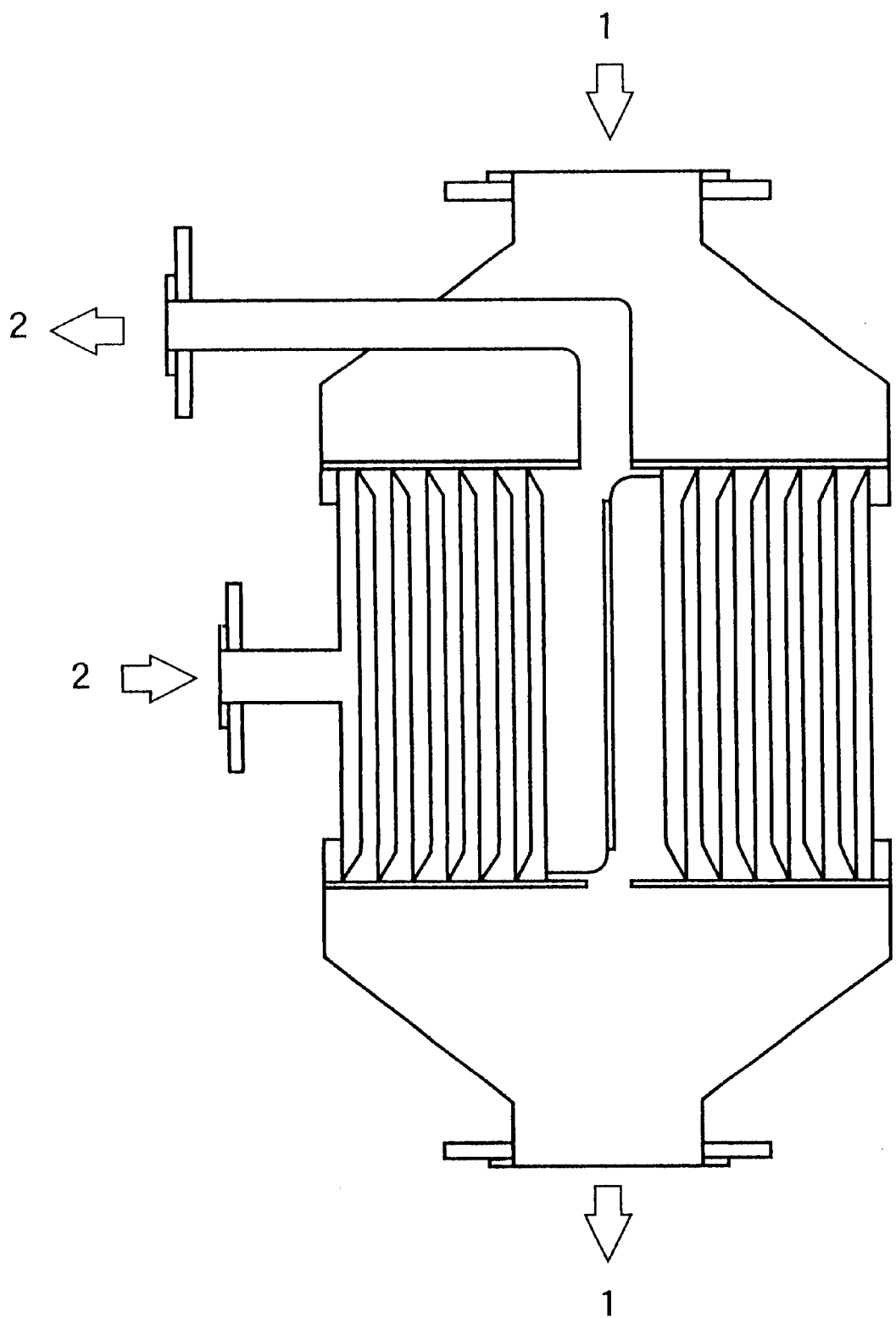
FIG. 3 is a longitudinal sectional conceptual view of a vertical orthogonal current flow type spiral heat exchanger.

The spiral type heat exchanger is commercially available in general, and such commercially available ones can be used in the present invention. Examples thereof include KSH-1V model produced by Kurose Co., Ltd. The path type may be either a countercurrent flow type or orthogonal current flow type if a spiral flow is obtained in the liquid side path.

In the present invention, the fluid path space is not less than 6 mm, preferably in the range of 8 to 15 mm. In the case where the path space is less than 6 mm, the polymerization cannot be prevented. The average liquid flow rate is not less than 0.2 m/sec, preferably in the range of 0.4 to 1 m/sec. In the case where the average flow rate is less than 0.2 m/sec, the polymerization cannot be prevented. In addition, the liquid residence time is not more than 100 seconds, preferably in the range of 60 to 15 seconds. In the case where the liquid residence time is more than 100 seconds, the polymerization cannot be prevented.

The easily polymerizable compound in the present invention means a compound which polymerizes during the heat exchange. Typical examples thereof include (meth)acrylic acid and its esters such as methyl esters, ethyl esters, n-propyl esters, isopropyl esters, n-butyl esters, isobutyl esters, and hydroxyethyl esters.

The heat exchange of the easily polymerizable compound in the present invention means heat exchange of an easily polymerizable compound that is a liquid during the heat exchange among the above easily polymerizable compounds, or means heat exchange of an easily polymerizable compound-containing liquid (for example, aqueous solution). As a matter of course, the easily polymerizable compounds may be used either alone respectively or in combinations with each other.

(Effects and Advantages of the Invention)

If the heat exchange is carried out using the vertical spiral type heat exchanger in accordance with the present invention, the polymerization in the heat exchanger can effectively be prevented to thereby enable long-term stable operation of the heat exchanger, and further that of the whole apparatus as well.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples.

EXAMPLE 1

To heat an aqueous solution with an acrylic acid content of 60 mass % from 35 to 70° C., a heat exchange was carried out by running the aqueous acrylic acid solution through a vertical spiral type heat exchanger with a path space of 8 mm (KSH-1V model produced by Kurose Co., Ltd.) under conditions where the average flow rate was 0.6 m/sec and where the residence time was 28 seconds. After about 6 months of operation, the operation was stopped to inspect the inside of the heat exchanger, but no polymer deposition was seen on the surface of the spiral plate.

COMPARATIVE EXAMPLE 1

A heat exchange was carried out in the same manner as of Example 1 except that a shell-and-tube type heat exchanger was used as the heat exchanger and that steam was introduced to the shell side and the aqueous acrylic acid solution to the tube side at an average flow rate of 0.7 m/sec. After about 2 months of operation, polymerization of the acrylic acid occurred in the tube to lead to clogging and a stop of the operation.

COMPARATIVE EXAMPLE 2

A heat exchange was carried out in the same manner as of Example 1 except that a horizontal spiral type heat exchanger with the same path space as that in Example 1 was used, and except that the conditions for introducing the aqueous acrylic acid solution were changed to those where the average flow rate was 0.5 m/sec and where the residence time was 35 seconds. After about 4 months of operation, it became impossible to supply the specified amount of aqueous acrylic acid solution, and the operation was stopped to inspect the inside of the heat exchanger to find that the entire surface of the spiral plate was covered with a polymer.

EXAMPLE 2

To cool butyl acrylate from 70 to 40° C., a heat exchange was carried out by running the butyl acrylate through a vertical spiral type heat exchanger with the same path space as that in Example 1 under conditions where the average flow rate was 0.24 m/sec and where the residence time was 75 seconds. After about 4 months of operation, the operation was stopped to inspect the inside of the heat exchanger, but no polymer deposition was seen on the spiral plate.

COMPARATIVE EXAMPLE 3

A heat exchange was carried out in the same manner as of Example 2 except that the conditions were changed to those where the average rate was 0.15 m/sec and where the residence time was 120 seconds. After about 1 month of operation, it became impossible to supply the specified amount of the acrylate, and the operation was stopped to inspect the inside of the heat exchanger to find that the surface of the spiral plate was covered with a polymer and that clogging was on the point of occurring.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A heat-exchanging and polymerization preventing method for an easily polymerizable compound and for effectively preventing polymerization of said easily polymerizable compound, in which a vertical spiral type heat exchanger with a fluid path space of not less than 6 mm is used as a heat exchanger to heat-exchange the easily polymerizable compound under conditions where the average liquid flow rate is not less than 0.2 m/sec and where the liquid residence time is not more than 100 seconds, such that polymerization of said easily polymerizable compound is effectively prevented.

2. A heat-exchanging and polymerization preventing method according to claim 1, wherein the easily polymerizable compound is at least one member selected from the group consisting of (meth)acrylic acid and its esters.

3. A heat-exchanging and polymerization preventing method according to claim 1, wherein said average liquid flow rate is in a range of 0.2 m/sec to 1 m/sec.

4. A heat-exchanging and polymerization preventing method according to claim 1, wherein said average liquid flow rate is in a range of 0.4 m/sec to 1 m/sec.

5. A heat-exchanging and polymerization preventing method according to claim 1, wherein said liquid residence time is in a range of 15 seconds to 100 seconds.

6. A heat-exchanging and polymerization preventing method according to claim 1, wherein said liquid residence time is in a range of 15 seconds to 60 seconds.

7. A heat-exchanging and polymerization preventing method comprising the steps of:

a) selecting an easily polymerizable compound;
b) selecting a fluid path space of not less than 6 mm in a heat-exchanger for the easily polymerizable compound;
c) having the easily polymerizable compound flow at an average rate of not less than 0.2 m/sec;
d) keeping the easily polymerizable compound in the heat exchanger for a selected amount of liquid residence time, wherein said selected amount of liquid residence time is not more than 100 seconds; and
e) directing the easily polymerizable compound to flow spirally about a vertical axis in the heat exchanger such that polymerization of said easily polymerizable compound is effectively prevented.

8. In the art of vertical spiral heat exchangers, a heat-exchanging and polymerization preventing method comprising the steps of:

a) selecting an easily polymerizable compound;
b) selecting a fluid path space of not less than 6 mm in a vertical spiral heat-exchanger for the easily polymerizable compound;
c) having the easily polymerizable compound flow at an average rate of not less than 0.2 m/sec;
d) keeping the easily polymerizable compound in the heat exchanger for a selected amount of liquid residence time, wherein said selected amount of liquid residence time is not more than 100 seconds; and
e) effectively preventing polymerization of said easily polymerizable compound by directing the easily polymerizable compound to flow spirally about a vertical axis in the heat exchanger.

9. A heat-exchanging and polymerization preventing method according to claim 8, wherein the step of selecting an easily polymerizable compound comprises the step of selecting at least one member from the group consisting of (meth)acrylic acid and its esters.

* * * * *